2,827,282
AIR SUSPENDED VEHICLE

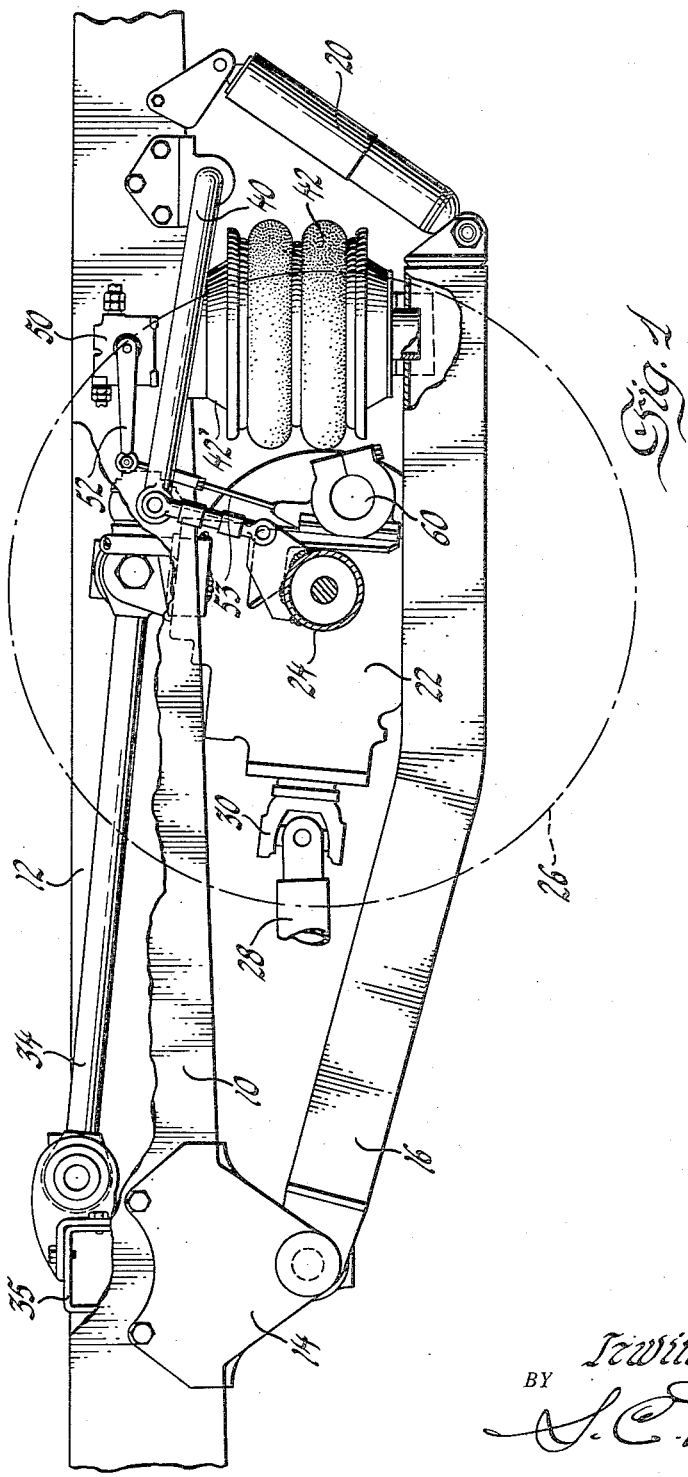

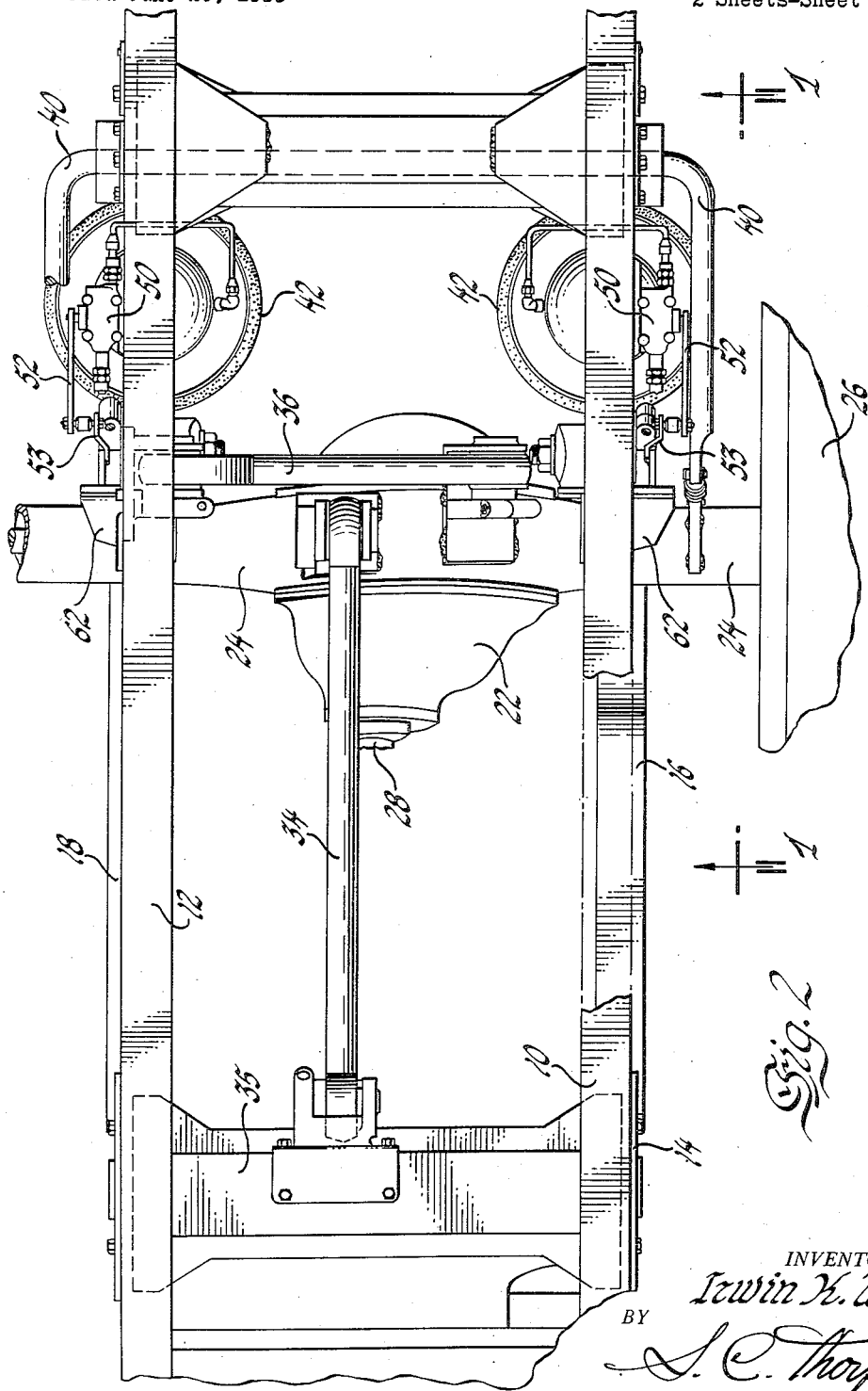

Irwin K. Weiss, Birmingham, Mich., assignor to General Motors Corporation, Detroit, Mich., a corporation of Delaware Application June 25, 1956, Serial No. 593,720

4 Claims. (Cl. 267—15)

This invention concerns a pneumatic rear suspension particularly adapted for four wheel vehicles in which the rear axle is the driving axle.

A principal object of the invention is to provide such a suspension which affords excellent riding qualities with good stability.

Another object is to provide a suspension system in which certain parts are multi-functional, the number of parts thus being held to a minimum.

Still another object is to provide a rear suspension which is adapted for use with a Hotchkiss drive, i. e. a drive which does not involve employment of a torque tube encasing the propeller shaft and taking braking and acceleration reactions.

Additional objects and features of the invention will be apparent from the following description of a preferred embodiment thereof. The description will proceed with reference to the accompanying drawings wherein, Figure 1 is a side elevation of a suspension system, with certain parts appearing in section or shown broken away; and Figure 2 is a plan of the suspension of Figure 1.

In the drawings, the numerals 10 and 12 denote the side rail components of the vehicle frame. Brackets 14, of which there is one fixed to each side rail 10, 12, provide pivotal connections for beams 16, 18 extending rearwardly to shock absorbers 20 through which the beams are again linked to the frame side rails.

As indicated by the differential housing 22, axle 24 which has a road wheel 26 at either end thereof, is a driving axle. Connection of the differential mechanism to the propeller shaft 28 is effected through a universal joint 30, as is conventional.

A longitudinally disposed thrust rod 34 having pivotal connection with both the differential housing 22 and a transverse frame member 35 operates to take braking and acceleration loads. Similarly, transverse loads induced by side sway are taken by a second thrust rod 36 pivotally connected to the differential housing and the frame component 12.

Disposed generally rearwardly of the last-mentioned thrust rod is a U-shaped stabilizer or torsion bar 40 supported by the frame side rails through brackets apertured to accommodate the bar and suitably connected through brackets to the driving axle 24 outward of the frame side rails. It will be understood that in operation this bar twists to accommodate differential displacements of the driving wheels.

Each of the beams 16, 18 supports an air spring 42 comprising a header member 42' fixedly secured to the corresponding side rail. These beams are made hollow to the end of providing air reservoirs for the springs, which are open to the beams. Thus, operation of the springs is marked by the exchange of air between the springs and the beams.

Levelling valves 50 having body portions fixed to the frame members and arms 52 connected to the driving axle 24 via adjustable links 53 may be considered as conforming to the disclosure of Rossman Patent 2,670,201, granted February 23, 1954. Suffice it to say here that each valve 50 has confined within the housing component thereof a member actuated through the arm 52 and operating to admit air to or exhaust air from the corresponding spring 42 to the end that the vehicle frame is maintained at a constant spacing with reference to the axle 24 irrespective of the load carried by the vehicle. The valves each comprise as an essential part a hydraulic dashpot which renders them incapable of operation from ordinary road shocks. Accordingly, except for leakage and pressure changes due to temperature variations, the valves normally function only when the vehicle is stationary, that is during loading and unloading of the vehicle.

While the valves 50 are shown in the instant drawings as being connected to the pneumatic springs, it will be understood that they could just as well be connected to the beams 16, 18, the latter being in open communication at all times with the springs. The levelling valves are supplied with air through a tank, not shown, maintained at a predetermined pressure by a compressor normally powered by the engine of the vehicle. Each valve comprises a vent through which the springs exhaust on a reduction in load.

It should be noted that the beams 16, 18 have pivotal connections 60 with the axle 24 and that these connections, which are located intermediate the ends of the beams, are effected through supports 62 encircling the axle housing.

The invention having been thus described and illustrated what is claimed is:

1. In an automotive vehicle having a rear axle mounting a road wheel at either end thereof, a suspension comprising a pair of rearwardly extending beams pivotally connected at their forward ends to the vehicle frame and serving as air reservoirs, said beams being connected at their trailing ends to said frame through a pair of shock absorbing devices and having a pivotal connection with said axle located at a point intermediate said first two connections, and an air spring on each beam and connected to said frame, each spring being open to the reservoir space provided by the beam on which it seats.

2. A suspension for an automotive vehicle having frame side rails and a rear driving axle, said suspension comprising a pair of rearwardly extending beams pivotally connected at their forward ends to said rails and serving as air reservoirs, said beams being connected at their trailing ends to said rails through a pair of shock absorbing devices and having a pivotal connection with said axle at a point intermediate said first two connections, and an air spring on each beam and connected to the corresponding side rail, each spring being open to the reservoir space provided by the beam on which it seats.

3. A suspension for an automotive vehicle comprising a frame having a pair of side rails, a cross member interconnecting said rails, and a rear driving axle, said suspension including a pair of rearwardly extending beams pivotally connected at their forward ends to said rails and serving as air reservoirs, said beams being connected at their trailing ends to said rails through a pair of shock absorbing devices and having a pivotal connection with said axle at a point intermediate said first two connections, an air spring on each beam and connected to the corresponding side rail, each spring being open to the reservoir space provided by the beam on which it seats, and a pair of thrust members pivotally connected, respectively, to said cross member and said axle and to one of said side rails and said axle.

4. A suspension according to claim 3 further comprising a generally U-shaped torsion member supported by said rails and connected at its ends to said axle, said member being positioned rearwardly of said axle and operating to resist differential displacements of said beams.

References Cited in the file of this patent

UNITED STATES PATENTS

| 2,218,634 | Best | Oct. 22, 1940 |
| 2,691,420 | Fox et al. | Oct. 12, 1954 |
| 2,713,498 | Brown | July 19, 1955 |